Jan. 29, 1963 W. A. FAVILL ETAL 3,075,383
FLOWMETER
Filed Dec. 14, 1960 5 Sheets-Sheet 1

INVENTORS
WILLIAM ARNOLD FAVILL
DENNIS GILBERT TAYLOR
BY
Moses, Nolte, & Nolte
ATTORNEYS

LIQUID FLOW—GATE "OPEN" CURRENT PULSES TO COUNTER

GAS FLOW — GATE "SHUT" CURRENT PULSES BY-PASSED.

Jan. 29, 1963 W. A. FAVILL ETAL 3,075,383
FLOWMETER
Filed Dec. 14, 1960 5 Sheets-Sheet 4

INVENTORS
WILLIAM ARNOLD FAVILL
DENNIS GILBERT TAYLOR

Jan. 29, 1963   W. A. FAVILL ETAL   3,075,383
FLOWMETER

Filed Dec. 14, 1960   5 Sheets-Sheet 5

INVENTORS
WILLIAM ARNOLD FAVILL
DENNIS GILBERT TAYLOR

United States Patent Office 3,075,383
Patented Jan. 29, 1963

1

3,075,383
FLOWMETER
William Arnold Favill, Wolverhampton, and Dennis Gilbert Taylor, Woodsetton, near Dudley, England, assignors to Integral Limited, Wolverhampton, England, a British company
Filed Dec. 14, 1960, Ser. No. 75,848
4 Claims. (Cl. 73—231)

This invention relates to flow meters of the type comprising a rotor mounted within a conduit and arranged to coact with a transducer coil external to the conduit to generate electrical pulses at a repetition frequency determined by the rate of flow of fluid through the conduit and a counter for counting the pulses so generated.

One object of the invention is to provide a flow meter of the above type for use in measuring the flow of liquids associated with air and which will discriminate between the passage of liquid and air through the conduit.

The invention accordingly provides a flow meter of the above specified type which includes means for sensing the nature of the fluid flowing through the conduit and means controlled thereby for preventing the counter from registering the pulses from the transducer coil when air is traversing the conduit but permitting the counter to operate when liquid is traversing the conduit.

More specifically, the flow meter according to the invention includes a pair of probes in the conduit, an electronic oscillator which is coupled to the probes and controlled as to its effectiveness by the electrical resistance of the fluid flowing through the conduit and a gate controlled by the oscillator for preventing the passage of pulses to the counter when air is traversing the conduit but permitting such passage of pulses when liquid is traversing the conduit.

Preferably the probes of the flowmeter are situated upstream of the rotor and this has the advantage that we avoid inaccuracies which might be caused by the last traces of liquid (e.g. milk) being flung by the rotor on to the probes on its down run in air. Preferably one of the probes is constituted by the wall of the conduit and the other is located at or near the centre of the conduit. No contact can then be made by the latter probe with any traces of milk travelling along the wall of the conduit.

Normally the rotor of a flow meter of the above type carries a magnet, on one of its blades near the tip thereof, which coacts with the transducer coil to generate pulses as the rotor is rotated by the fluid. This, however, is undesirable due to corrosion difficulties when the flow of a liquid such as milk is to be measured. Another object of the invention is to provide an improved form of rotor such that the magnet is effectively maintained out of contact with the fluid but is nevertheless capable of generating strong signals in the transducer coil.

The invention accordingly also provides a flow meter of the above type in which a magnet is housed within the hub of the rotor with its magnetic axis extending axially of the rotor and in which the hub and blades of the rotor are made of magnetic material and so constitute, in effect, an extension of the magnet.

Alternative constructions of flow meter embodying both of the above features and suitable for use with milk will now be described in more detail, by way of example, with reference to the accompanying drawings in which.

2

Figure 4:
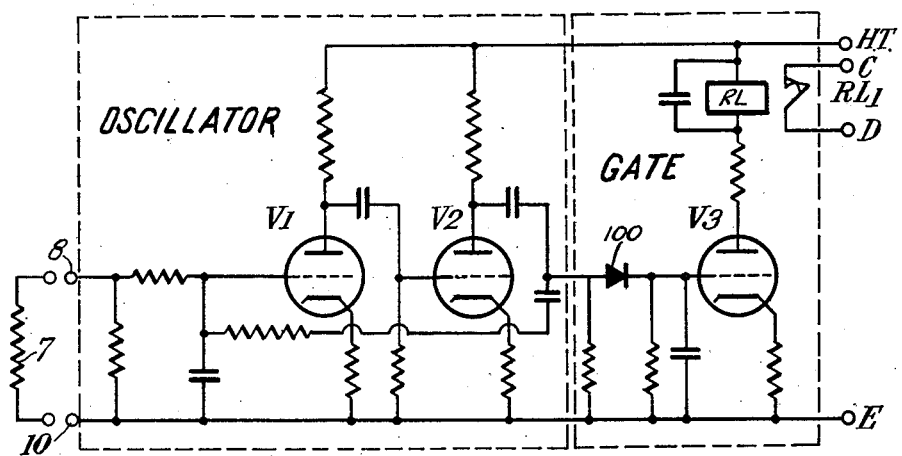
FIG. 4 is a circuit diagram.
Figure 4A:
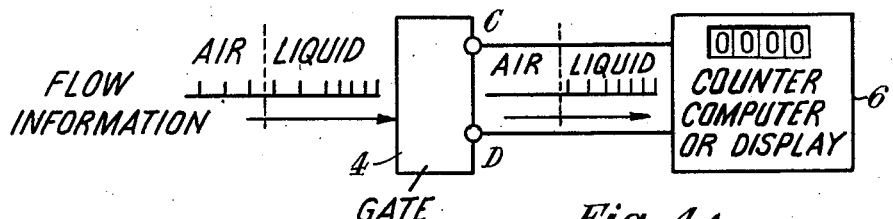
Figure 5A:
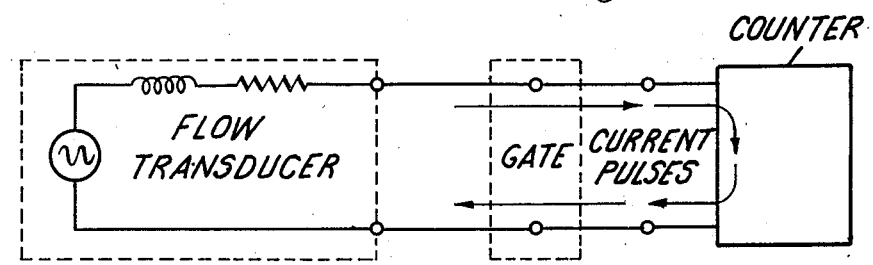
Figure 5B:
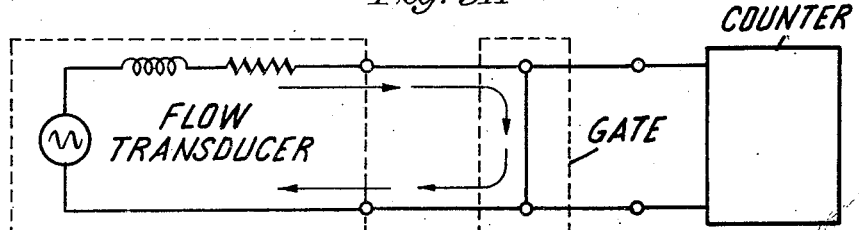
Figure 6:
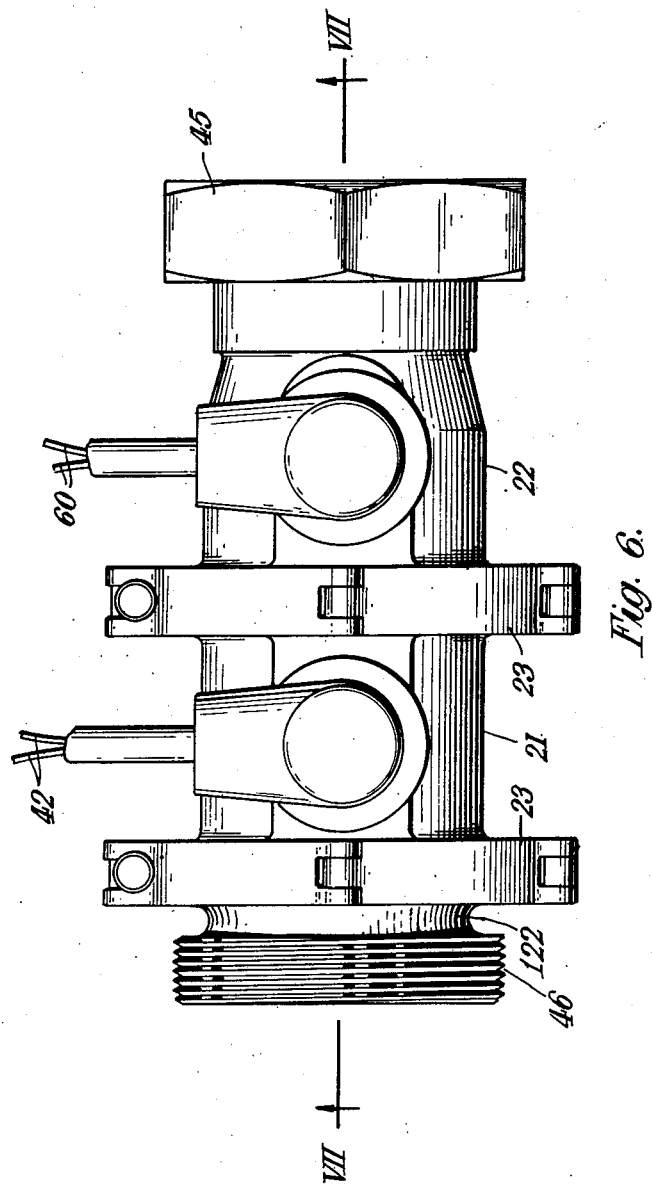
Figure 7:
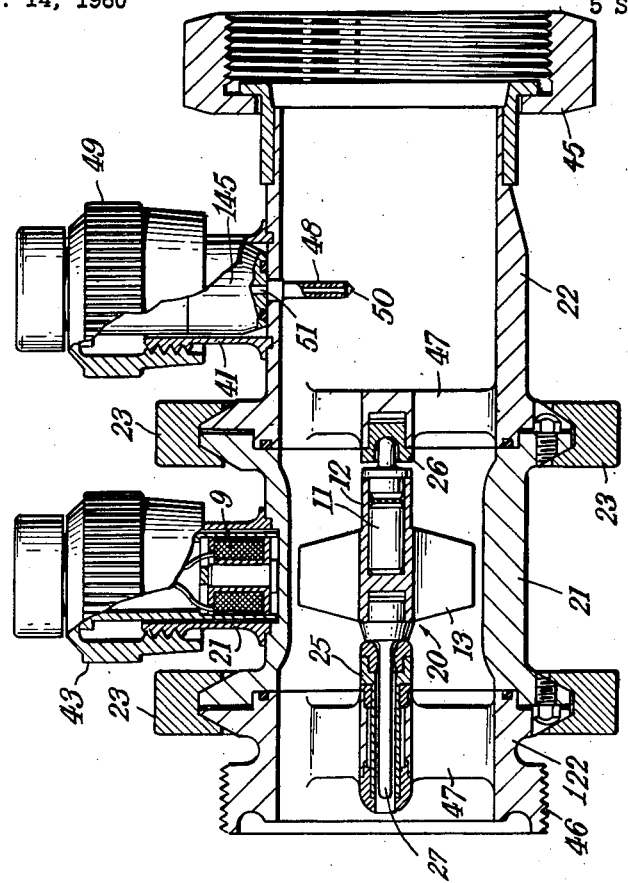

FIGS. 4A, 5A and 5B are further block diagrams,

FIG. 6 is a plan view of a second embodiment,

FIG. 7 is a section on the line VII—VII in FIG. 6, and

Figure 8:
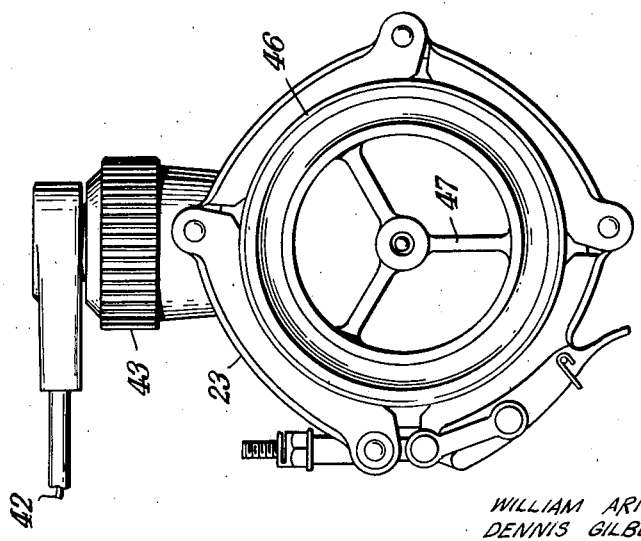

FIG. 8 is an end view looking from the left hand side in FIG. 7.

Figure 2:
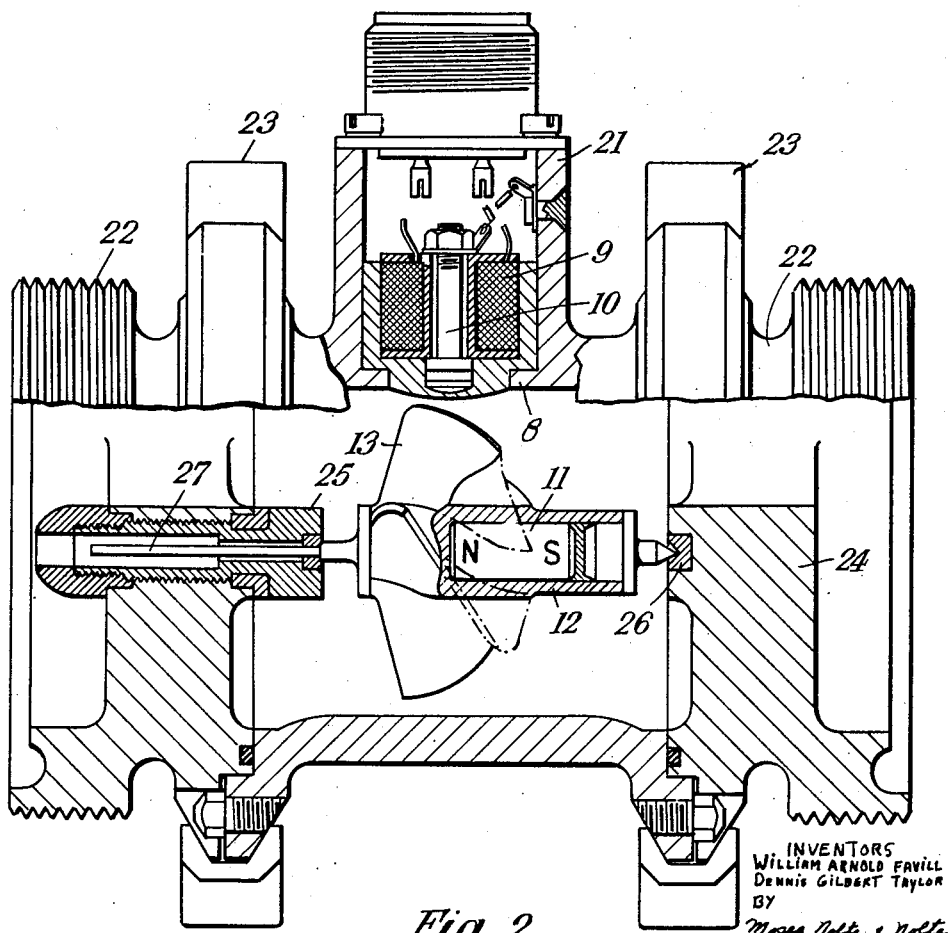
FIG. 2 is a part sectional view through the rotor.
Figure 3:
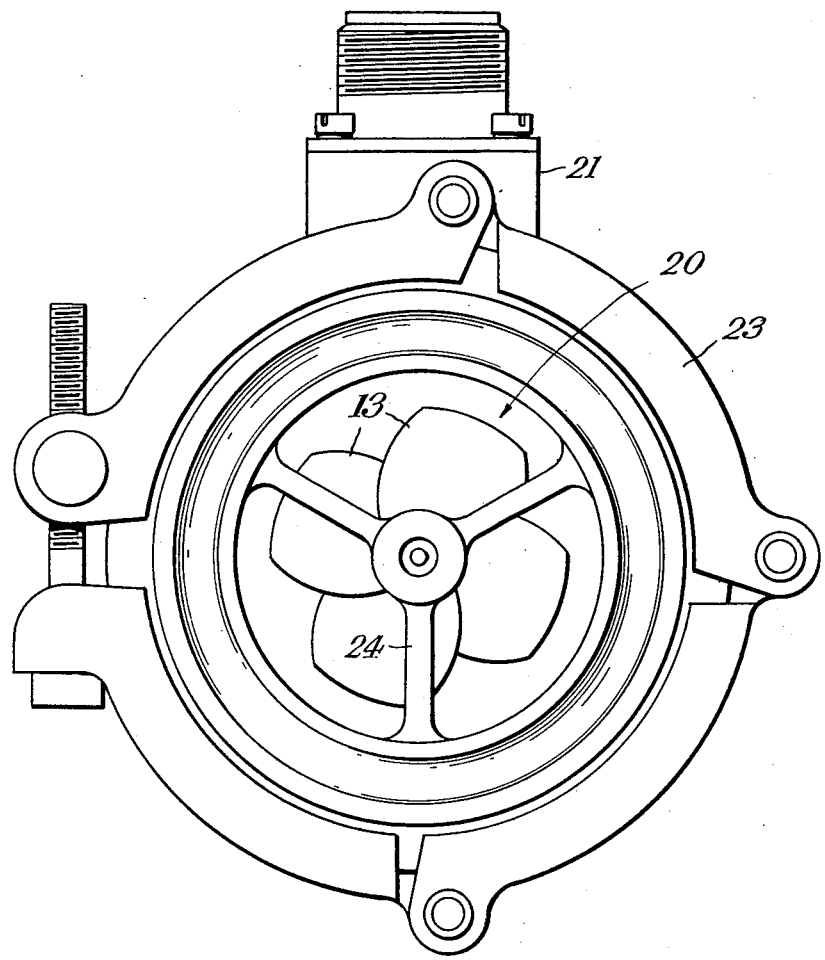
FIG. 3 is a corresponding end elevation.

Referring first of all to FIGS. 2 and 3 of the drawings, a rotor 20 is mounted in a housing intended for connection in a pipe line through which the flow of milk to be measured takes place. The housing consists of a centre portion 21 and two end portions 22 held together by clamping rings 23. In the portions 22 of the housing are spiders 24 supporting bearings 25, 26 for the ends of the spindle 27 of the rotor. The rotor is formed with a hub 12 and blades 13 of magnetic stainless steel and within the hub 12 is enclosed, so as to be effectively shielded from the milk, a magnet 11, having its N—S axis on the centre line of the rotor. The blades 13 therefore constitute an extension of the magnet and are effective to induce large signals in a transducer coil 9 external to the conduit through which the milk flows. Two probes 8, 10 are provided for sensing the resistance of the fluid flowing through the housing, one being constituted by the portion of the housing surrounding the transducer coil 9, and the other by a bolt which retains the coil in position.

Figure 1:
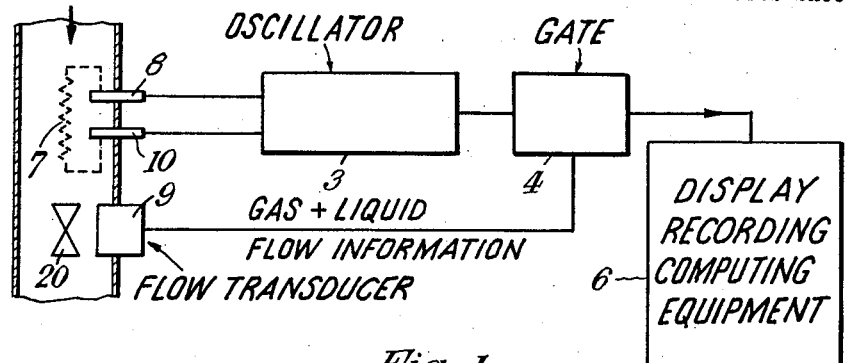
FIG. 1 is a block diagram of a first embodiment of the invention.

Referring now to FIGS. 1 and 4 of the drawings, the probes 8, 10 form part of the circuit of a Wien bridge oscillator 3 constituted by tubes $V_1$ and $V_2$. The fluid flowing past the probes constitutes an effective resistance 7 between the probes. When air is flowing past the probes the resistance 7 is high, the oscillator oscillates and the A.C. output of the oscillator is fed to the gate 4, which rectifies and smooths this output and applies a positive D.C. voltage to the grid of a tube $V_3$ having a rectifier 100 in its grid circuit, so maintaining a high current through the tube $V_3$ with the result that a relay RL in the anode circuit of the tube $V_3$ is energized to cause a contact $RL_1$ to short circuit contacts C and D and so, as shown in FIG. 5B, prevent pulses from the coil 9 being passed to a counter 6. This may, as described in British specification No. 752,496, be an electro-magnetic counter preceded by a chain of electronic frequency dividers and a shaping circuit for shaping the pulses generated in the coil 9.

When, however, milk flows past the probes 8, 10 in place of air, the resistance 7 decreases, the oscillator ceases to oscillate, the current through the anode load of the tube $V_3$ decreases and the relay RL opens the contact $RL_1$ to enable the pulses generated in the coil 9 to pass to and be counted by the counter, as indicated in FIG. 5A.

In the alternative construction shown in FIGS. 6-8, the rotor 20 of the flow meter is again mounted in a housing consisting of abutting sections 21, 22, 122 held together by clamping rings 23. A male end fitting 45 is provided on the upstream end section 22 and a female end fitting 46 forms part of the downstream end section 122 and this ensures that the flow meter will be correctly installed in the pipe line. In the housing are formed spiders 47 supporting bearings 26, 25 for the rotor. The blades 13 and hub 12 of the rotor are of magnetic stainless steel and within the hub is enclosed a magnet 11 having its N—S axis on the centre line of the hub of the rotor.

Fitted to the exterior of the housing are two laterally projecting sleeves 21, 41. In the sleeve 21 is mounted a transducer coil 9, which is connected to the electrical circuit of the flow meter by leads 42 and which is removably held in position by a screw cap 43. In the sleeve 41 is mounted a block 145 of insulating material, which has an extension 48 projecting inwardly towards the centre line of the housing and is held in place in the sleeve 41 by a screw cap 49. One air probe is constituted by the projecting tip 50 of a metal rod 51 mounted within the insulating block 145. Leads 60 from the electrical circuit, which is as illustrated in FIG. 4, are connected to the rod 51 and the sleeve 41. The other air probe is thus constituted by the inner wall of the housing.

In addition to the advantages indicated above, the arrangement of air probes upstream of the rotor provides a far more rapid response to the presence of air in the fluid flowing through the housing than the construction described with reference to FIGS. 1–5.

What we claim as our invention and desire to secure by Letters Patent is:

1. A flow meter comprising a conduit, a rotor mounted within the conduit and arranged to be rotated by passage of fluid through the conduit, a transducer coil external to the conduit which coacts with said rotor to generate pulses at a repetition frequency determined by the rate of flow of fluid through the conduit, a counter for counting the pulses generated by said coil, a pair of probes in the conduit, an electronic oscillator which is coupled to the probes and controlled as to its effectiveness by the electrical resistance of the fluid flowing through the conduit and a gate controlled by the oscillator for preventing the passage of pulses from the coil to the counter when air is traversing the conduit but permitting such passage of pulses when liquid is traversing the conduit.

2. A flow meter according to claim 1, in which the probes are situated upstream of the rotor.

3. A flow meter according to claim 2, in which one of the probes is constituted by the wall of the conduit and the other is located at or near to the centre of the conduit.

4. A flow meter according to claim 1, in which the oscillator is a Wien bridge oscillator which is maintained in oscillation when air is flowing past the probes and is caused to cease oscillation when liquid is flowing past the probes.

References Cited in the file of this patent
UNITED STATES PATENTS

| | | |
|---|---|---|
| 1,189,348 | Costello | July 4, 1916 |
| 2,270,141 | Potter | Jan. 13, 1942 |
| 2,299,406 | Potter | Oct. 20, 1942 |
| 2,617,299 | Ennis et al. | Nov. 11, 1952 |
| 2,683,224 | Cole | July 6, 1954 |
| 2,859,619 | Fellows | Nov. 11, 1958 |
| 2,882,727 | Newbold | Apr. 21, 1959 |